United States Patent
Ju (10) Patent No.: US 12,461,562 B2
(45) Date of Patent: Nov. 4, 2025

(54) DOCKING STATION

(71) Applicant: Getac Technology Corporation, New Taipei (TW)

(72) Inventor: Shuan-Yeong Ju, Taipei (TW)

(73) Assignee: Getac Technology Corporation, New Taipei (TW)

( * ) Notice: Subject to any disclaimer, the term of this patent is extended or adjusted under 35 U.S.C. 154(b) by 347 days.

(21) Appl. No.: 18/109,342

(22) Filed: Feb. 14, 2023

(65) Prior Publication Data

US 2023/0400882 A1 Dec. 14, 2023

Related U.S. Application Data

(60) Provisional application No. 63/350,910, filed on Jun. 10, 2022.

(30) Foreign Application Priority Data

Oct. 26, 2022 (CN) .......................... 202211314637.9

(51) Int. Cl.
*G06F 1/16* (2006.01)

(52) U.S. Cl.
CPC .................................. *G06F 1/1632* (2013.01)

(58) Field of Classification Search
CPC .............................. G06F 1/1632; H01R 12/91
See application file for complete search history.

(56) References Cited

U.S. PATENT DOCUMENTS

| | | | | |
|---|---|---|---|---|
| 5,768,101 A | * | 6/1998 | Cheng ..................... | G06F 1/203 361/679.55 |
| 6,034,869 A | * | 3/2000 | Lin ........................ | G06F 1/1632 361/679.43 |
| 6,061,234 A | * | 5/2000 | Broder .................. | G06F 1/1632 361/679.41 |

(Continued)

FOREIGN PATENT DOCUMENTS

| EP | 1876507 A1 | 1/2008 |
|---|---|---|
| EP | 2163965 A1 | 3/2010 |

(Continued)

OTHER PUBLICATIONS

EESR-EU23161563.4, European Search Report, Sep. 26, 2023.
(Continued)

*Primary Examiner* — Anthony M Haughton
*Assistant Examiner* — Theron S Milliser
(74) *Attorney, Agent, or Firm* — Troutman Pepper Locke LLP; Tim Tingkang Xia, Esq.

(57) ABSTRACT

A docking station is configured for an electronic device to be docked thereto. The docking station includes a casing, a circuit board and at least one electrical connector. The casing has an accommodation space, an upper surface and at least one protrusion structure. The upper surface faces away from the accommodation space, the protrusion structure protrudes from the upper surface, the protrusion structure has a wide portion and a narrow portion connected to each other, and a width of the wide portion is greater than a width of the narrow portion. The circuit board is located in the accommodation space. The electrical connector protrudes from the upper surface of the casing and electrically connected to the circuit board.

13 Claims, 6 Drawing Sheets

(56) References Cited

U.S. PATENT DOCUMENTS

| | | | |
|---|---|---|---|
| 6,191,943 B1* | 2/2001 | Tracy | G06F 1/203 |
| | | | 361/679.55 |
| 6,362,959 B2* | 3/2002 | Tracy | G06F 1/1632 |
| | | | 361/689 |
| 6,697,252 B2 | 2/2004 | Maeda | |
| 6,833,988 B2* | 12/2004 | Kamphuis | G06F 1/1632 |
| | | | 361/679.41 |
| 8,929,059 B2* | 1/2015 | Anwei | G06F 1/1632 |
| | | | 248/229.22 |
| D730,905 S | 6/2015 | Li | |
| 9,632,536 B1 | 4/2017 | Kuo | |
| 9,910,457 B2* | 3/2018 | Tsukasaki | G06F 1/1632 |
| 10,156,868 B2 | 12/2018 | Iwamoto et al. | |
| 10,348,026 B1 | 7/2019 | Cheng et al. | |
| D865,769 S | 11/2019 | Lu | |
| 10,976,777 B2* | 4/2021 | Pischel | H04M 1/04 |
| 2001/0007525 A1* | 7/2001 | Tracy | G06F 1/1632 |
| | | | 361/679.55 |
| 2001/0030851 A1 | 10/2001 | Usui et al. | |
| 2004/0061996 A1* | 4/2004 | Kamphuis | G06F 1/1601 |
| | | | 361/679.41 |
| 2010/0265652 A1 | 10/2010 | Agata et al. | |
| 2013/0163156 A1* | 6/2013 | Anwei | G06F 1/1632 |
| | | | 361/679.01 |
| 2015/0318653 A1 | 11/2015 | Carnevali | |
| 2016/0349793 A1* | 12/2016 | Tsukasaki | G06F 1/1632 |
| 2017/0023974 A1 | 1/2017 | Yanagida et al. | |
| 2021/0048848 A1* | 2/2021 | Pischel | G06F 1/1656 |
| 2024/0152182 A1* | 5/2024 | Huang | G06F 1/1632 |

FOREIGN PATENT DOCUMENTS

| | | |
|---|---|---|
| JP | 2010020506 A | 1/2010 |
| TW | I677144 B | 11/2019 |

OTHER PUBLICATIONS

Au2023200698, Examination Report, IPO(Australia), Aug. 24, 2023.
Taiwan Patent Office, "Office Action", Jun. 16, 2023, Taiwan.
Examination Report issued by the IPO(Australia) Jul. 10, 2025.

* cited by examiner

DOCKING STATION

CROSS-REFERENCE TO RELATED APPLICATIONS

This non-provisional application claims priority under 35 U.S.C. § 119(a) on Provisional Patent Application No(s). 63/350,910 filed in U.S.A. on Jun. 10, 2022, and Patent Application No(s). 202211314637.9 filed in China on Oct. 26, 2022, and the entire contents of which are hereby incorporated by reference.

TECHNICAL FIELD

The disclosure relates to a docking station, more particularly to a docking station for an electronic device.

BACKGROUND

In general, a notebook computer can be placed on a docking station and docked to electrical connectors of the docking station, such that the functions of the notebook computer can be expanded when expansion sockets of the docking station are connected to external devices.

After the notebook computer is placed on the docking station, a support plate of the docking station resists the weight of the notebook computer, such that the support plate may be deformed as time goes by. As a result, it would be difficult for the notebook computer to be accurately docked to the electrical connectors of the docking station, which causes an unsuccessful connection between the notebook computer and the electrical connectors of the docking station. Therefore, how to solve the aforementioned issue is one of the crucial topics in this field.

SUMMARY

The disclosure provides a docking station which is capable of preventing the unsuccessful connection between the notebook computer and the electrical connectors of the docking station.

One embodiment of the disclosure provides a docking station. The docking station is configured for an electronic device to be docked thereto. The docking station includes a casing, a circuit board and at least one electrical connector. The casing has an accommodation space, an upper surface and at least one protrusion structure. The upper surface faces away from the accommodation space, the protrusion structure protrudes from the upper surface, the protrusion structure has a wide portion and a narrow portion connected to each other, and a width of the wide portion is greater than a width of the narrow portion. The circuit board is located in the accommodation space. The electrical connector protrudes from the upper surface of the casing and electrically connected to the circuit board.

Another embodiment of the disclosure provides a docking station. The docking station is configured for an electronic device to be docked thereto. The docking station includes a casing, a circuit board and at least one electrical connector. The casing has an accommodation space, an upper surface and at least one protrusion structure. The upper surface faces away from the accommodation space, the protrusion structure protrudes from the upper surface, the protrusion structure has a side surface, the side surface has a first straight part, a turning part and a second straight part, the first straight part is connected to the second straight part via the turning part, the first straight part and the second straight part extend towards a same direction, and an extension direction of the turning part is non-parallel to extension directions of the first straight part and the second straight part. The circuit board is located in the accommodation space. The electrical connector protrudes from the upper surface of the casing and electrically connected to the circuit board.

According to the docking station as disclosed in the above embodiment, the protrusion structure protrudes from the upper surface of the casing, and the protrusion structure has the wide portion with larger width and the narrow portion with smaller width, such that the structural strength of the casing can be enhanced so as to prevent the casing supporting the electronic device from being deformed due to the weight of the electronic device. Therefore, the electronic device is ensured to be accurately docked to the electrical connectors.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 1:
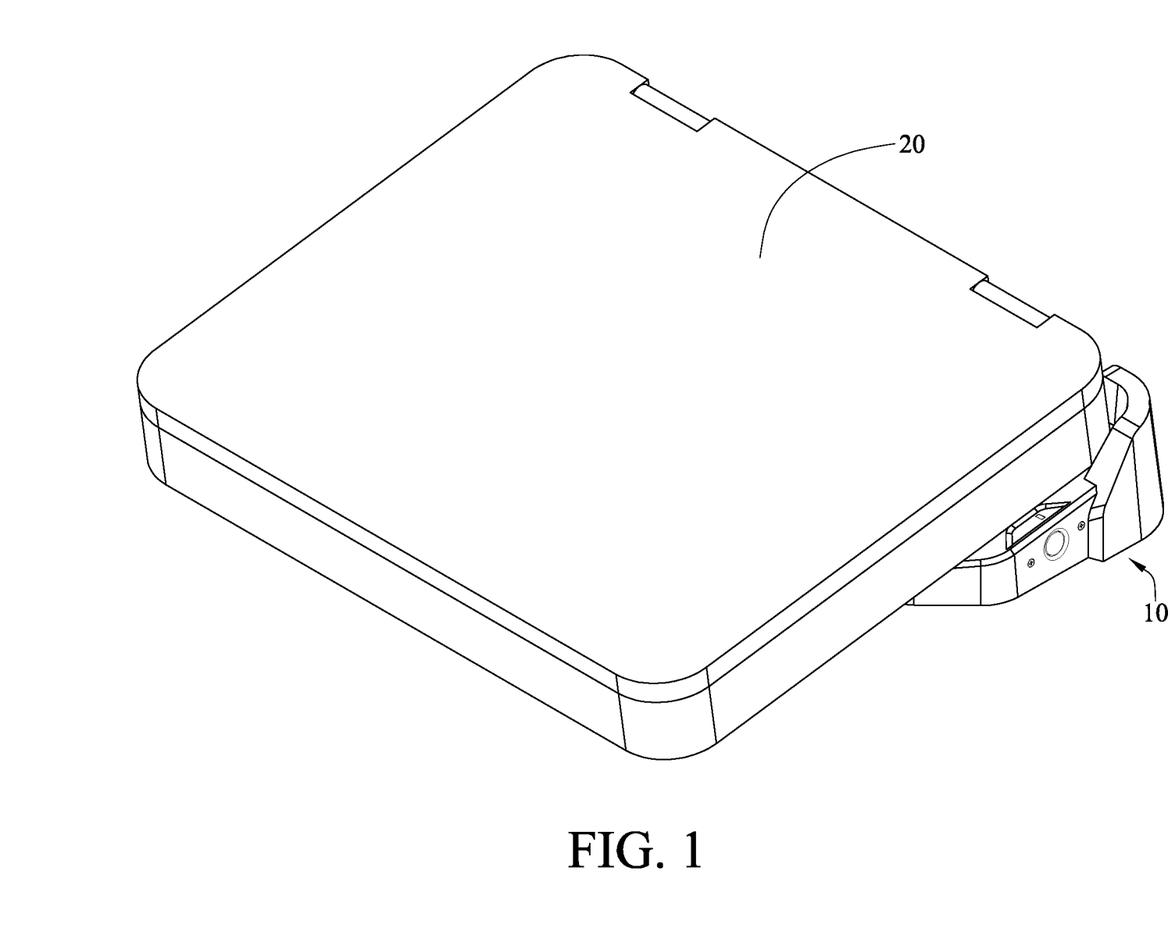
FIG. 1 is a perspective view of an electronic device and a docking station according to one embodiment of the disclosure.
Figure 2:
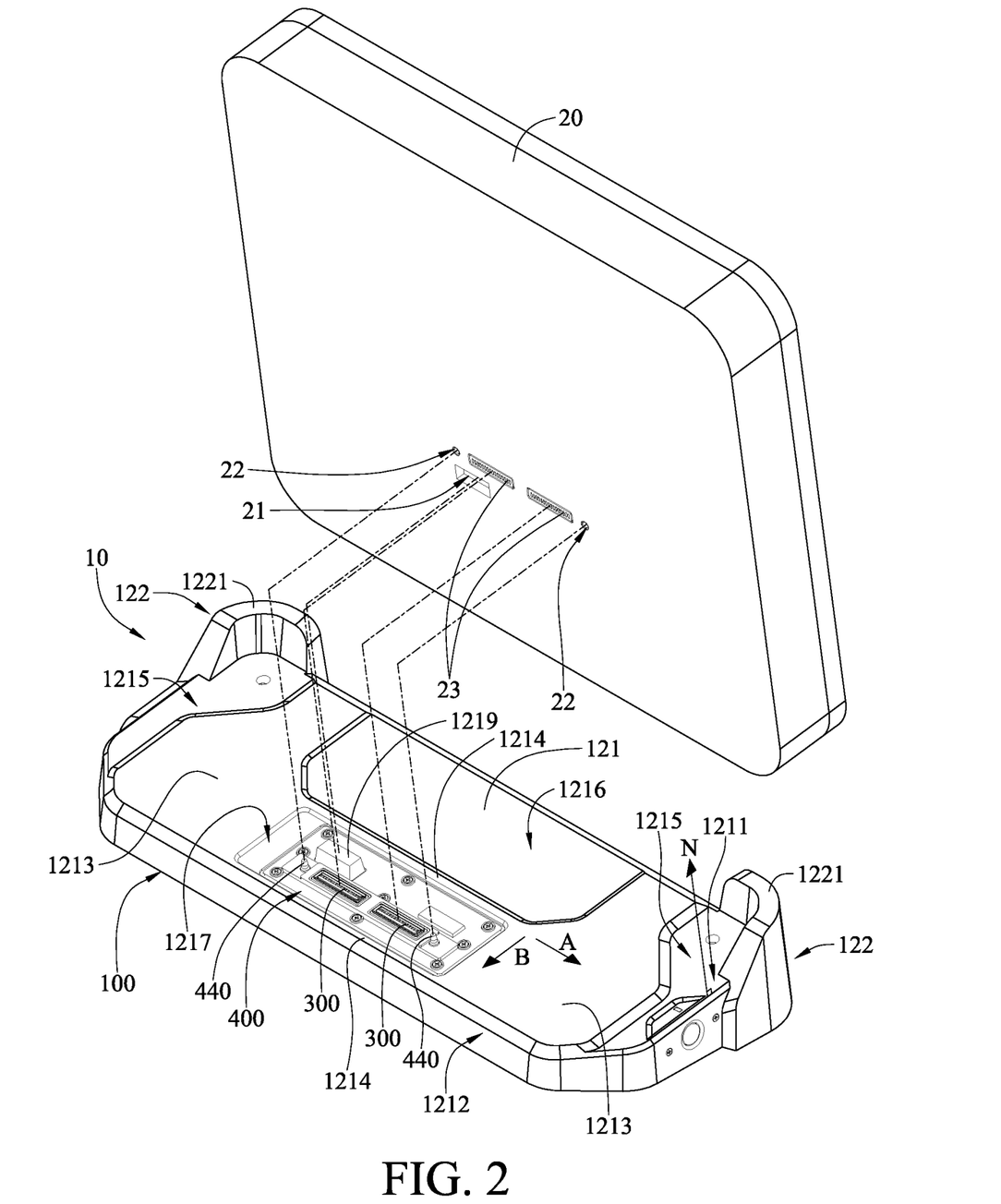
FIG. 2 is an exploded view of the electronic device and the docking station in FIG. 1.
Figure 3:
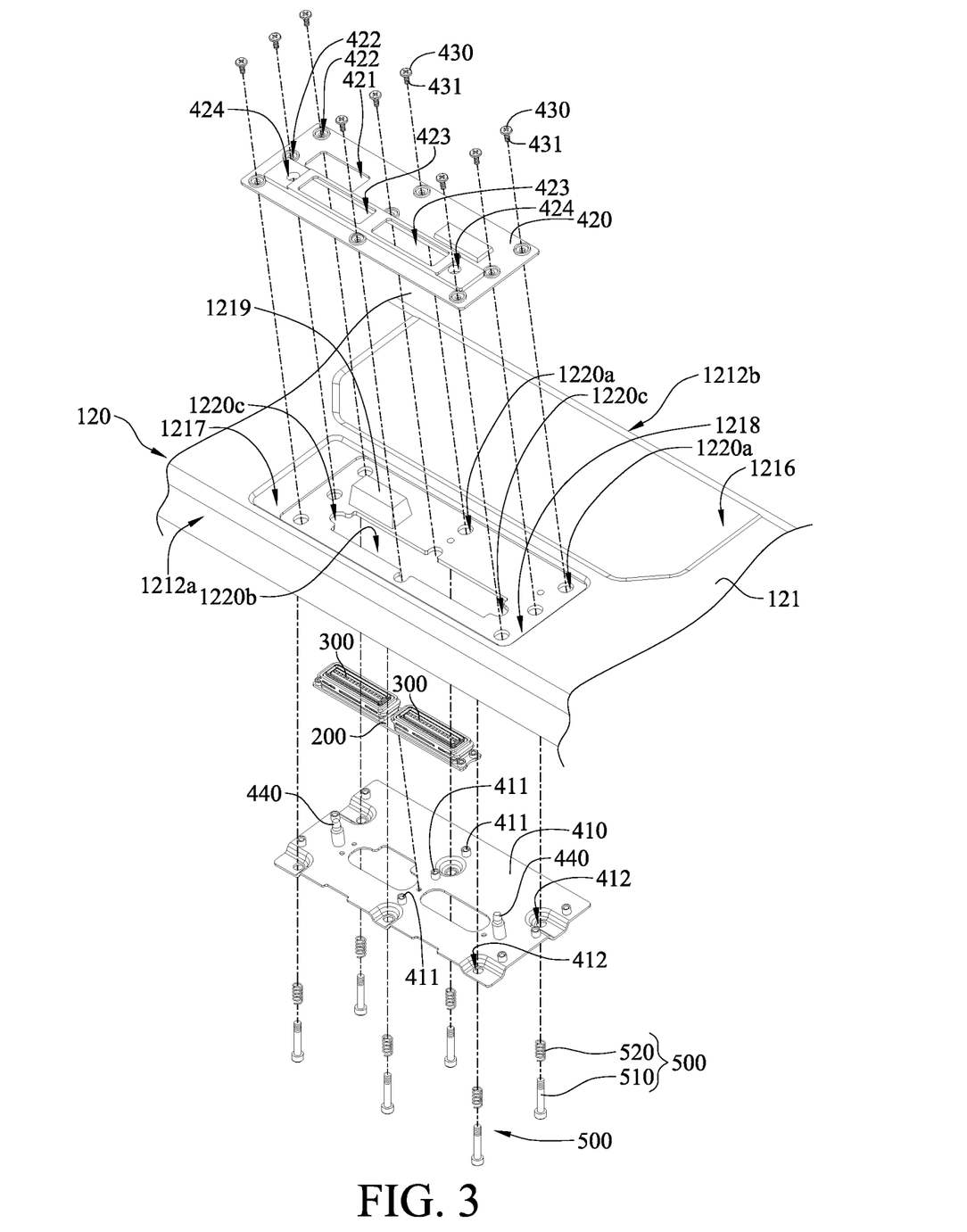
FIG. 3 is a partial exploded view of the docking station in FIG. 1.

Refer to FIGS. 1 to 3, where FIG. 1 is a perspective view of an electronic device 20 and a docking station 10 according to one embodiment of the disclosure, FIG. 2 is an exploded view of the electronic device 20 and the docking station 10 in FIG. 1, and FIG. 3 is a partial exploded view of the docking station 10 in FIG. 1.

In this embodiment, the docking station 10 is configured for the electronic device 20 to be docked thereto. The electronic device 20 is, for example, a notebook computer.

The docking station 10 includes a casing 100, a circuit board 200 and two electrical connectors 300. In addition, the docking station 10 may further include a floating seat 400.

Figure 4:
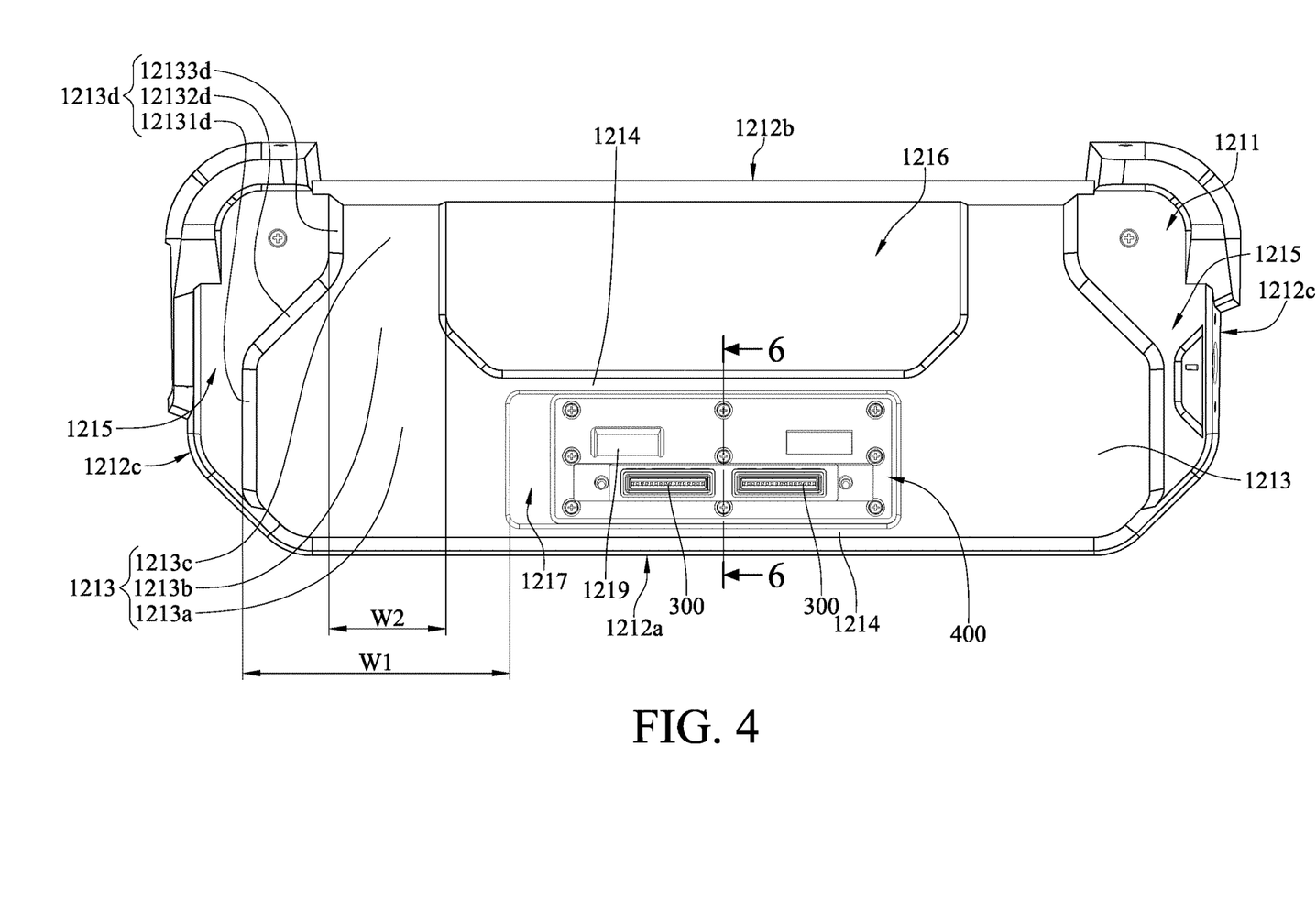
FIG. 4 is a top view of the docking station in FIG. 1.
Figure 5:
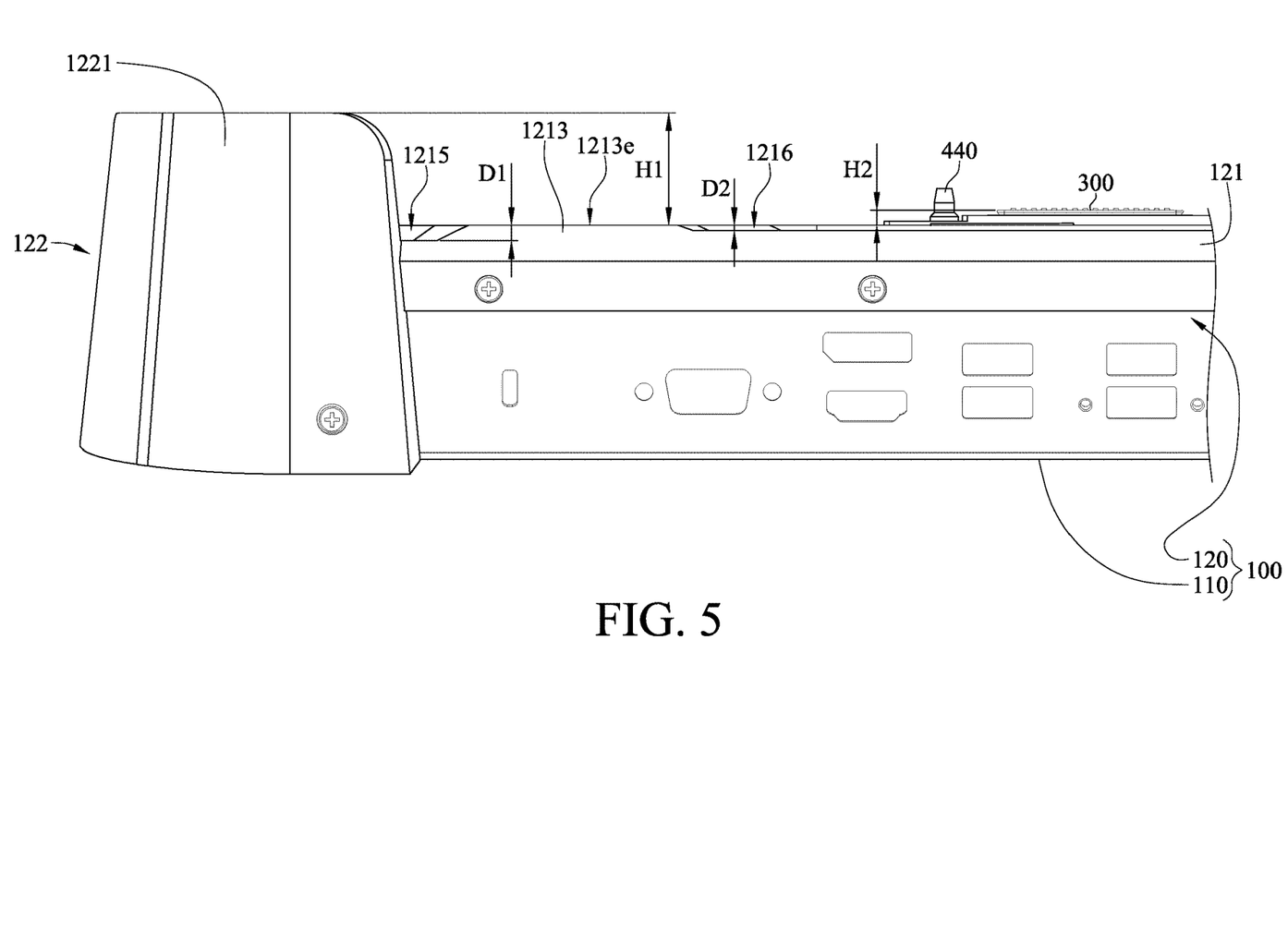
FIG. 5 is a partial rear view of the docking station in FIG. 1.
Figure 6:
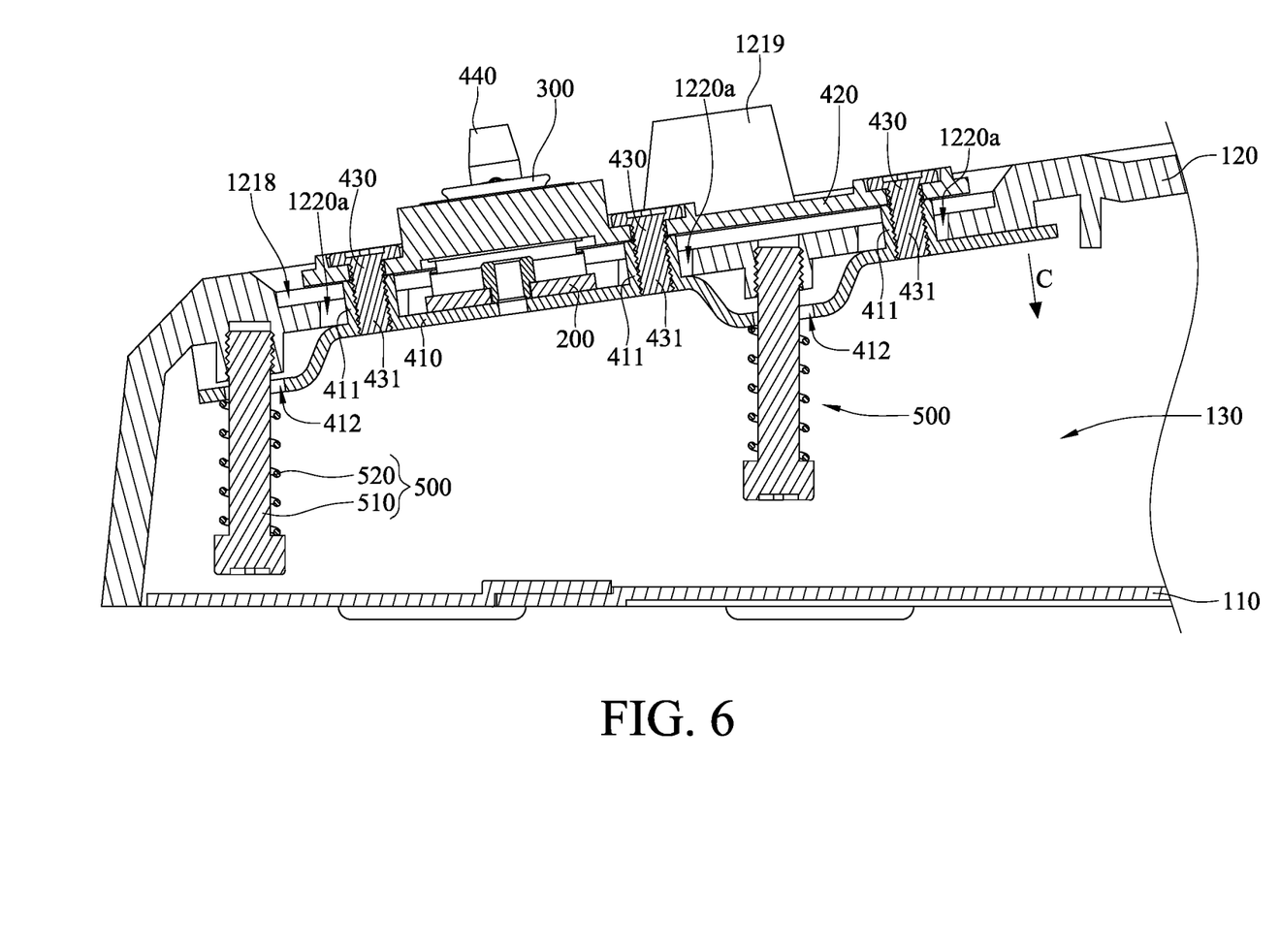
FIG. 6 is a partial cross-sectional view of the docking station in FIG. 4 taken along a line 6-6.

Then, refer to FIGS. 2 to 6, where FIG. 4 is a top view of the docking station 10 in FIG. 1, FIG. 5 is a partial rear view of the docking station 10 in FIG. 1, and FIG. 6 is a partial cross-sectional view of the docking station 10 in FIG. 4 taken along a line 6-6.

The casing 100 includes a base 110 and a cover 120 assembled with each other, and the base 110 and the cover 120 together form an accommodation space 130. The cover 120 includes a support portion 121. The support portion 121 has an upper surface 1211, an outer circumferential surface 1212 and four protrusion structures 1213 and 1214. The upper surface 1211 faces away from the accommodation space 130, and the outer circumferential surface 1212 is connected to a periphery of the upper surface 1211. The outer circumferential surface 1212 has a front part 1212a, a rear part 1212b and two lateral parts 1212c. The front part 1212a is located opposite to the rear part 1212b, and the two lateral parts 1212c are located opposite to each other and are connected to the front part 1212a and the rear part 1212b. The four protrusion structures 1213 and 1214 protrude from the upper surface 1211. The two protrusion structures 1213 are located opposite to each other and extend along a direction from the front part 1212a towards the rear part 1212b of the outer circumferential surface 1212. The two protrusion structures 1214 extend along a direction from one of the lateral parts 1212c to the other and are connected to the two protrusion structures 1213. The two protrusion structures 1213 and the two lateral parts 1212c of the outer circumferential surface 1212 form two recesses 1215, respectively, and the protrusion structures 1213, one of the protrusion structures 1214 and the rear part 1212b of the outer circumferential surface 1212 form another recess 1216, where a depth D1 of each of the recess 1215 is greater than a depth D2 of the recess 1216. In addition, the four protrusion structures 1213 and 1214 together form another recess 1217.

In this embodiment, the protrusion structures 1213 are the same in structure, and thus the following descriptions merely introduce one of them. The protrusion structure 1213 has a wide portion 1213a, a tapered portion 1213b and a narrow portion 1213c. The wide portion 1213a is located closer to the front part 1212a of the outer circumferential surface 1212 than the tapered portion 1213b and the narrow portion 1213c. The tapered portion 1213b is located between and connected to the wide portion 1213a and the narrow portion 1213c. A width W1 of the wide portion 1213a is greater than a width W2 of the narrow portion 1213c, and the width W2 of the narrow portion 1213c is, for example, smaller than a half of the width W1 of the wide portion 1213a, but the disclosure is not limited thereto. A width of the tapered portion 1213b gradually decreases along a direction from the wide portion 1213a towards the narrow portion 1213c. In addition, the protrusion structure 1213 further has a side surface 1213d. The side surface 1213d is, for example, an inclined surface. The side surface 1213d is connected to the upper surface 1211 and extends from the wide portion 1213a to the narrow portion 1213c. The side surface 1213d has a first straight part 12131d, a turning part 12132d and a second straight part 12133d. The first straight part 12131d, the turning part 12132d and the second straight part 12133d respectively correspond to the wide portion 1213a, the tapered portion 1213b and the narrow portion 1213c. The first straight part 12131d is connected to the second straight part 12133d via the turning part 12132d. The first straight part 12131d and the second straight part 12133d extend along a same direction, and the extension direction of the turning part 12132d is non-parallel and non-perpendicular to the extension surfaces of the first straight part 12131d and the second straight part 12133d.

In this embodiment, the support portion 121 of the cover 120 further has an accommodation recess 1218 and a first positioning protrusion 1219. The accommodation recess 1218 is recessed from the bottom of the recess 1217, and the first positioning protrusion 1219 is located in the accommodation recess 1218. Moreover, the cover 120 further includes two outer positioning portions 122. The two outer positioning portions 122 are respectively located at two opposite corners of one side of the support portion 121, and each of the outer positioning portions 122 is connected to the rear part 1212b and one of the lateral part 1212c of the outer circumferential surface 1212 and protrudes from the upper surface 1211. Each of the outer positioning portions 122 has a second positioning protrusion 1221. Distances from the first positioning protrusion 1219 to the two second positioning protrusions 1221 are different from each other; that is, one of the second positioning protrusions 1221 is located closer to the first positioning protrusion 1219 than the other. The first positioning protrusion 1219 and the two second positioning protrusions 1221 are configured to roughly position the electronic device 20 during the placement of the electronic device 20 onto the casing 100, which will be further introduced in the later paragraphs.

In this embodiment, the support portion 121 of the cover 120 further has a plurality of first through holes 1220a, a second through hole 1220b and two third through holes 1220c. The first through holes 1220a are in an array arrangement. The second through hole 1220b is located between two rows of the first through holes 1220a, and the two third through holes 1220c are respectively located at two opposite sides of the second through hole 1220b. The first through holes 1220a, the second through hole 1220b and the third through holes 1220c are located between and connected to the accommodation recess 1218 and the accommodation space 130.

The floating seat 400 includes a metal substrate 410, a support plate 420 and a plurality of fasteners 430. In addition, the floating seat 400 further includes two positioning components 440.

The metal substrate 410 is partially located in the accommodation space 130. The metal substrate 410 has a plurality of fastening structures 411, and the fastening structures 411 are, for example, female threaded pillars. The fastening structures 411 are respectively located in the first through holes 1220a, and sizes of the fastening structures 411 are respectively smaller than sizes of the first through holes 1220a.

A size of the support plate 420 is slightly smaller than a size of the accommodation recess 1218. The support plate 420 is movably located in the accommodation recess 1218. The support plate 420 has a through hole 421, a plurality of first openings 422, two second openings 423 and two third openings 424. A size of the through hole 421 is greater than a size of the first positioning protrusion 1219, and the first positioning protrusion 1219 is disposed through the through hole 421 of the support plate 420. The first openings 422 respectively correspond to the first through holes 1220a, the second openings 423 correspond to the second through hole 1220b, and the third openings 424 respectively correspond to the third through holes 1220c.

The fasteners 430 are, for example, screws or bolts. Each of the fasteners 430 has a fastening portion 431. The fastening portions 431 are respectively disposed through the first openings 422 of the support plate 420 and screwed into the fastening structures 411 of the metal substrate 410.

The circuit board 200 is located in the accommodation space 130 and fixed to the metal substrate 410. The two electrical connectors 300 are disposed on the circuit board 200 and are disposed through the second through hole 1220b of the support portion 121 of the cover 120 and the two second openings 423 of the support plate 420 so as to be exposed to outside. A size of the second through hole 1220b of the support portion 121 of the cover 120 is greater than an overall size of the two electrical connectors 300. As shown in FIG. 5, a height H1 of the second positioning protrusion 1221 relative to the top surface 1213e of the protrusion structure 1213 is greater than a height H2 of the electrical connector 300 relative to the top surface 1213e of the protrusion structure 1213. Preferably, the height H1 may be above three times greater than the height H2. For example, the height H1 may be about 22.00 mm, and the height H2 may be about 2.99 mm.

The positioning components 440 are, for example, pillar made of metal material. The positioning components 440 and the metal substrate 410 are, for example, made of a single piece. The positioning components 440 are respectively disposed through the third through holes 1220c of the support portion 121 of the cover 120 and the third openings 424 of the support plate 420.

In this embodiment, the docking station 10 may further include a plurality of buffering components 500, and the metal substrate 410 may further have a plurality of through holes 412. Each of the buffering components 500 includes a screw 510 and a spring 520. Sizes of the through holes 412 of the metal substrate 410 are greater than sizes of the screws 510. The screws 510 are respectively disposed through the springs 520 and the through holes 412 of the metal substrate 410 and are screwed into the support portion 121 of the cover 120. Two opposite ends of each of the springs 520 respectively press against one side of the metal substrate 410 located opposite to the circuit board 200 and a head portion of one screw 510. The springs 520 are configure to force the metal substrate 410 to move away from the base 110 for lifting up the metal substrate 410.

In this embodiment, the sizes of the first through holes 1220a are greater than the sizes of the fastening structures 411 which are configured for the fastening portions 431 of the fasteners 430 to be screwed therein, the size of the second through hole 1220b is greater than the overall size of the two electrical connectors 300, and the sizes of the through holes 412 of the metal substrate 410 are greater than the sizes of the screws 510, such that the floating seat 400, the circuit board 200 and the electrical connectors 300 on the floating seat 400 can be moved relative to the casing 100 along directions A and B which are perpendicular to a normal line N of the upper surface 1211 for helping the electronic device 20 to be mounted on the docking station 10. In addition, the buffering components 500 enable the floating seat 400, the circuit board 200 and the electrical connector 300 on the floating seat 400 to be movable relative to the casing 100 along a direction C which is parallel to the normal line N of the upper surface 1211 for helping the electronic device 20 to be mounted on the docking station 10. The following paragraph will introduce the placement process of the electronic device 20 on the docking station 10.

Firstly, two opposite corners of one side of the electronic device 20 are moved towards the two second positioning protrusions 1221 to be in contact with the two second positioning protrusions 1221 in an inclined manner, then the electronic device 20 is laid on the docking station 10, such that the first positioning protrusion 1219 is inserted into a positioning recess 21 of the electronic device 20. Then, the electronic device 20 is slightly moved, such that the two positioning components 440 are respectively inserted into two positioning insertion holes 22 of the electronic device 20. As a result, the placement process of the electronic device 20 on the docking station 10 is completed.

In this embodiment, the height H1 of the second positioning protrusion 1221 relative to the top surface 1213e of the protrusion structure 1213 is greater than the height H2 of the electrical connector 300 relative to the top surface 1213e of the protrusion structure 1213, such that the position of the second positioning protrusion 1221 can be easily to be seen, thereby helping the electronic device 20 to be mounted on the docking station 10.

Furthermore, the cooperation of the first positioning protrusion 1219 of the support portion 121 and the second positioning protrusions 1221 of the outer positioning portion 122 of the cover 120 can roughly position the electronic device 20 during the preliminary of the installation of the electronic device 20 on the docking station 10 for helping the electronic device 20 to be accurately positioned in the later process. Note that the first positioning protrusion 1219 and the second positioning protrusions 1221 are optional structures and may be omitted in some other embodiments.

In this embodiment, the floating seat 400, the circuit board 200 and the electrical connector 300 on the floating seat 400 can be moved relative to the casing 100, and the relative positions of the two positioning components 440 and the two electrical connectors 300 are stationary, such that the movable floating seat 400 can absorb an assembling tolerance between two electrical connectors 23 of the electronic device 20 and the two electrical connectors 300 of the docking station 10. Therefore, after the two positioning components 440 are respectively inserted in to the two positioning insertion holes 22 of the electronic device 20, the two electrical connectors 23 of the electronic device 20 are accurately docked to the two electrical connectors 300 of the docking station 10.

In addition, in this embodiment, since the fasteners 430 are screwed into the metal substrate 410, the structural strength between the fasteners 430 and the metal substrate 410 can be ensured to be strong enough, thereby preventing the metal substrate 410 from being damaged at the positions where the fasteners 430 are screwed due to a downward force when the electronic device 20 is placed on the docking station 10 or another external force.

In this embodiment, the buffering components 500 enable the floating seat 400, the circuit board 200 and the electrical connector 300 on the floating seat 400 to be moved towards the base 110 to absorb an impact during the placement of the electronic device 20 on the docking station 10. Therefore, the two electrical connectors 23 of the electronic device 20 can be more stably docked to the two electrical connectors 300 of the docking station 10.

Note that the buffering components 500 and the positioning components 440 are optional components and may be omitted in some other embodiments.

In addition, the support plate 420 of the floating seat 400 is not restricted to being movably located in the accommodation recess 1218 of the support portion 121 of the casing 100. In some other embodiments, the support portion of the casing may not have the accommodation recess, and the support plate may be directly and movably located in the recess 1217 formed by the four protrusion structures 1213 and 1214. Furthermore, the two protrusion structures 1214 are optional structures and may be omitted in some other embodiments, and the support plate may be directly and movably located at the upper surface of the support portion of the cover.

Moreover, the floating seat 400 may be an optional component and may be omitted in some other embodiments.

In this embodiment, the protrusion structures 1213 protrude from the upper surface 1211 of the casing 100, and each protrusion structure 1213 has the wide portion 1213*a* with larger width and the narrow portion 1213*c* with smaller width, such that the structural strength of the casing 100 can be enhanced so as to prevent the casing 100 supporting the electronic device 20 from being deformed due to the weight of the electronic device 20. Therefore, the electronic device 20 is ensured to be accurately docked to the electrical connectors 300, and the lifespan of the docking station 10 can be elongated.

Moreover, the first straight part 12131*d* and the second straight part 12133*d* of the side surface 1213*d* of the protrusion structure 1213 extend along the same direction, and the extension direction of the turning part 12132*d* of the side surface 1213*d* of the protrusion structure 1213 is non-parallel and non-perpendicular to the extension directions of the first straight part 12131*d* and the second straight part 12133*d*, such that an area of the side surface 1213*d* of the protrusion structure 1213 can be increased. Therefore, the support portion 121 of the cover 120 can have a stronger structural strength to resist the weight of the electronic device 20, and the lifespan of the docking station 10 can be further elongated.

Note that the extension direction of the turning part 12132*d* is not restricted to being non-perpendicular to the extension directions of the first straight part 12131*d* and the second straight part 12133*d*; in some other embodiments, the extension direction of the turning part may be perpendicular to the extension directions of the first straight part and the second straight part; that is, the protrusion structure may merely have the wide portion and the narrow portion but without the tapered portion.

Note that the quantity of the electrical connectors 300 is not restricted and may be modified to be one.

According to the docking station as disclosed in the above embodiment, the protrusion structures protrude from the upper surface of the casing, and each protrusion structure has the wide portion with larger width and the narrow portion with smaller width, such that the structural strength of the casing can be enhanced so as to prevent the casing supporting the electronic device from being deformed due to the weight of the electronic device. Therefore, the electronic device is ensured to be accurately docked to the electrical connectors.

Moreover, the first straight part and the second straight part of the side surface of the protrusion structure extend along the same direction, and the extension direction of the turning part of the side surface of the protrusion structure is non-parallel and non-perpendicular to the extension directions of the first straight part and the second straight part, such that an area of the side surface of the protrusion structure can be increased. Therefore, the support portion of the cover can have the stronger structural strength to resist the weight of the electronic device, and the lifespan of the docking station can be elongated.

Furthermore, the cooperation of the first positioning protrusion of the support portion and the second positioning protrusions of the outer positioning portion of the cover can roughly position the electronic device during the preliminary of the installation of the electronic device on the docking station for helping the electronic device to be accurately positioned in the later process.

In addition, the floating seat, the circuit board and the electrical connector on the floating seat can be moved relative to the casing, and the relative positions of the two positioning components and the two electrical connectors are stationary, such that the movable floating seat can absorb an assembling tolerance between two electrical connectors of the electronic device and the two electrical connectors of the docking station. Therefore, after the two positioning components are respectively inserted into the two positioning insertion holes of the electronic device, the two electrical connectors of the electronic device are accurately docked to the two electrical connectors of the docking station.

Since the fasteners are screwed into the metal substrate, the structural strength between the fasteners and the metal substrate can be ensured to be strong enough, thereby preventing the metal substrate from being damaged at the positions where the fasteners are screwed due to a downward force when the electronic device is placed on the docking station or another external force.

The buffering components enable the floating seat, the circuit board and the electrical connector on the floating seat to be moved towards the base to absorb an impact during the placement of the electronic device on the docking station. Therefore, the two electrical connectors of the electronic device can be more stably docked to the two electrical connectors of the docking station.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A docking station, configured for an electronic device to be docked thereto, comprising:
    a casing, having a base, a cover, an accommodation space and at least one protrusion structure, wherein the accommodation space is formed between the base and the cover along a thickness direction of the casing, the cover has an upper surface, an outer circumferential surface and at least one outer positioning portion, the outer circumferential surface has a front part and a rear part opposite to each other, the at least one outer positioning portion is connected to the rear part of the outer circumferential surface, the upper surface faces away from the accommodation space, the at least one protrusion structure protrudes from the upper surface, the at least one protrusion structure has a wide portion and a narrow portion connected to each other, the wide portion is located closer to the front part of the outer circumferential surface than the narrow portion, and a width of the wide portion is greater than a width of the narrow portion;
    a circuit board, located in the accommodation space; and
    at least one electrical connector, protruding from the upper surface of the casing and electrically connected to the circuit board.

2. The docking station according to claim 1, wherein the width of the narrow portion is smaller than a half of the width of the wide portion.

3. The docking station according to claim 1, wherein the at least one protrusion structure further has a side surface, the side surface is connected to the upper surface and extends from the wide portion to the narrow portion, the side surface has a first straight part, a turning part and a second straight part, the first straight part is connected to the second straight part via the turning part, the first straight part and the second straight part extend towards a same direction, and an extension direction of the turning part is non-parallel to extension directions of the first straight part and the second straight part.

4. The docking station according to claim 3, wherein the extension direction of the turning part is non-perpendicular to the extension directions of the first straight part and the second straight part.

5. The docking station according to claim 1, wherein the at least one protrusion structure further has a tapered portion, two opposite sides of the tapered portion are respectively connected to the wide portion and the narrow portion, and a width of the tapered portion gradually decreases along a direction from the wide portion towards the narrow portion.

6. The docking station according to claim 1, wherein the quantity of the at least one protrusion structure of the casing is two, the two protrusion structures are respectively located at two opposite sides of the casing, and the at least one electrical connector is located between the two protrusion structures.

7. The docking station according to claim 1, wherein the casing comprises a support portion and the at least one outer positioning portion, the accommodation space, the upper surface and the at least one protrusion structure are located at the support portion, the support portion has the outer circumferential surface, the outer circumferential surface is connected to a periphery of the upper surface, and the outer positioning portion protrudes from the upper surface.

8. The docking station according to claim 7, wherein the quantity of the at least one outer positioning portion is two, and the two outer positioning portions are respectively located at two opposite corners of one side of the support portion.

9. The docking station according to claim 7, wherein the at least one protrusion structure has a top surface, and a height of the outer positioning portion relative to the top surface is greater than a height of the at least one electrical connector relative to the top surface.

10. The docking station according to claim 1, wherein the casing has two recesses, the two recesses are respectively located at two opposite sides of the at least one protrusion structure, the wide portion and the narrow portion are arranged in an arranging direction, the narrow portion is located between the two recesses in a lateral direction perpendicular to the arranging direction, and depths of the two recesses are different from each other.

11. A docking station, configured for an electronic device to be docked thereto, comprising:

a casing, having an accommodation space, an upper surface and at least one protrusion structure, wherein the upper surface faces away from the accommodation space, the at least one protrusion structure protrudes from the upper surface, the casing has an outer circumferential surface, the outer circumferential surface has two lateral parts opposite to each other, the at least one protrusion structure has an outer side surface connected to the upper surface, the outer side surface is located at a side of the at least one protrusion structure facing toward a corresponding one of the lateral parts of the outer circumferential surface, the outer side surface has a first straight part, a turning straight part and a second straight part, the first straight part is connected to the second straight part via the turning straight part, the first straight part and the second straight part extend towards a same direction, and an extension direction of the turning straight part is non-parallel to extension directions of the first straight part and the second straight part;

a circuit board, located in the accommodation space; and at least one electrical connector, protruding from the upper surface of the casing and electrically connected to the circuit board.

12. The docking station according to claim 3, wherein the outer circumferential surface further has two lateral parts opposite to each other, and the side surface is an outer side surface located at a side of the at least one protrusion structure facing toward a corresponding one of the lateral parts of the outer circumferential surface.

13. The docking station according to claim 3, wherein the side surface is an inclined surface.

* * * * *